United States Patent Office 3,058,997

Patented Oct. 16, 1962

1

3,058,997

PHTHALIC ACID PRODUCTS PURIFICATION

Richard Perry Taylor, Costa Mesa, and James C. Selover, Fullerton, Calif., assignors to Richfield Oil Corporation, Los Angeles, Calif., a corporation of Delaware No Drawing. Filed May 23, 1958, Ser. No. 737,225
7 Claims. (Cl. 260—346.7)

This invention concerns the elimination of color from crude phthalic acid materials. More particularly, the process of the invention subjects crude phthalic acid materials to reduction and distillation during which the color impurities are converted to higher boiling materials and colorless phthalic acid materials are recovered.

Crude phthalic acid mixtures made by the liquid phase nitric acid oxidation of materials such as xylene and toluic acid, are frequently colorless in appearance and, therefore, acceptable for many uses without processing, although analytical methods, such as those involving measurement of light transmitted by the product in a standardized aqueous caustic solution may show the presence of impurities The greater part of the impurities are probably trace amounts of aromatic or benzene nitro compounds but other impurities of undetermined constitution seem to contribute to the undesired discoloration of the phthalic acid mixtures The color may appear in the newly manufactured phthalic acids or may develop on standing or exposure to elevated temperatures or actinic light Such color-forming impurities are occluded in the acid crystals and carry over into alkyd resins made from the phthalic acids, reducing or obliterating the market value of the end products; for example, in phthalic acids used to produce alkyd resins, the nitro impurities must not be greater than 0.1%. In uses which require less rigorous specifications it is frequently found that the mere removal of color so that the product is white or near white to the eye is satisfactory. The process of this invention is useful in reducing the color of certain phthalic acid materials to the various extents desired and therefore highly colored stocks may be substantially reduced in color to lighter colored stocks, or made colorless to the eye, or even further reduced in color so that in a standardized caustic soda solution they exhibit 60% or more light transmission at 365 mμ.

At least part of the process of the invention takes place while the crude mixture is in the molten state. Since phthalic acid itself decomposes before its melting point is reached, it is necessary to conduct part of the process on a derivative of phthalic acid which can melt without decomposing. Also, separation of the wanted product from the impurities by distillation makes it desirable to use a derivative which boils below its decomposition temperature and which does not require a distillation pressure which is too low for practical commercial use. Suitable derivatives are the phthalic acid esters and, in the case of orthophthalic acid, the anhydride.

The phthalic acid which can be treated in the process of this invention is derived from the nitric acid oxidation of various feedstocks, and the product may comprise an individual isomer of the acid or a mixture of isomers. Generally, the phthalic acids are afforded by oxidation of lower dialkylbenzenes or lower alkylbenzoic acids. Advantageously, the crude phthalic acid products can be obtained by the liquid phase nitric acid oxidation of toluic acid at a temperature from about 150° to 250° C. A mixture to which the process of the invention is applicable is produced, for example, when a mixture of 70% metatoluic acid and 30% paratoluic acid is oxidized

2 in a glass vessel by contact with 10% aqueous nitric acid at 200° C. and 275 p.s.i.g. with the use of 4.3 moles of nitric acid per mole of toluic acid.

The process outlined yields phthalic acids and phthalic acid derivatives which are in solution in water or whatever alternative polar solvent was used in the nitric acid oxidation. The distillation step of the process of this invention requires that the phthalic acid derivative be in molten form. There are several routes between the solution resulting from the nitric acid oxidation and the molten derivative.

Since the nitrophthalic acids are occluded in the crystal lattice of the crude phthalic acids substantial liquefaction of the crude phthalic acid mixture is necessary in the reduction step for the most complete reduction of the nitrophthalic acid impurities therein, but there are several different ways in which liquefaction suitable for conducting the reduction may be obtained. In general, the phthalic acid in the oxidizer effluent solution may be (1) subjected directly to reduction conditions, (2) converted to its salt form and subjected to reduction, (3) crystallized out of the solution and redissolved in a suitable solvent, then reduced, (4) crystallized out and converted to a meltable derivative and subjected to reduction in solution or molten form.

REDUCTION

The nitro and other color-forming impurities in crude phthalic acid produced by the nitric acid oxidation of disubstituted benzenes may be reduced by any convenient method, such as by treatment in the liquid state with reducing salts such as sodium bisulfite or by a reducing metal. The liquid state is preferably obtained by dissolving the phthalic acid or its derivative or by melting the derivative. The nitric acid oxidation process described above produces crude phthalic acid in an aqueous solution. This solution may be acted upon by the reducing agent while maintaining the acid in the dissolved state by preventing a temperature drop in the solution so great as to cause precipitation of the phthalic acid.

If desired, the effluent solution from the nitric acid oxidation may be contacted with a basic reacting compound of an alkaline metal such as the alkali metals sodium and potassium and the alkaline earth metals, calcium and barium to convert the phthalic acid to its salt. This solution may then be subjected to the reduction treatment. This alternative takes advantage of the solubility of these phthalic acid salts in an aqueous medium at a lower temperature than that required for completely dissolving phthalic acid in its free acid form.

If desired, the effluent from the nitric acid oxidation may be cooled immediately to precipitate the phthalic acid. The crude crystalline material may then be dissolved in any operable solvent which does not enter side reactions in the process. Suitable solvents include water, ethanol, methanol and other polar solvents. Water is the preferred solvent.

If the phthalic acids are converted to their salt form in the effluent, as described above, the salt may be crystallized from solution and redissolved in the same solvents as the free acid. The crystallized free acids may be converted to a meltable derivative, as outlined below, and this derivative may be dissolved in a suitable organic solvent such as ether or benzene. This solution may be conveniently subjected to the reduction treatment. Perhaps the simplest method of bringing about reduction of the nitro impurities, in view of the subsequent distillation step of the process of the invention, is crystallization of the crude phthalic acid from the oxidizer effluent, conversion of the crude acid to a meltable derivative and reduction of this derivative in the molten state.

The reduction treatment especially preferred, as a means for reducing the color-forming impurities, is the method reported in copending application Serial No. 709,735, filed January 20, 1958, whereby the color bodies in crude phthalic acid may be reduced by contacting an aqueous or other polar solution of the phthalic acids mixture produced by the nitric acid oxidation and containing the impurities, with hydrogen gas in the presence of a hydrogenation catalyst under temperature and pressure conditions suitable for the reduction of the nitro compounds contained in the mixture. It has now been discovered that catalytic hydrogenation is effective to reduce color impurities in crude phthalic acid when the acid is in molten-derivative form, as well as solution form. The phthalic acid may, therefore, be converted to its meltable derivative before or after the reduction. The hydrogenation or reduction conditions used are such as to effect selective reduction of nitro-containing and other readily reducible impurities but not such drastic conditions as to reduce the aromatic ring. The conditions include temperatures up to about 250° C. and pressures sufficient to maintain the liquid phase. The lower temperature limit at which the hydrogenation is conducted is determined by two conditions: the temperature at which liquefication (melting or dissolution) of the crude mixture of phthalic acid or derivative is substantially complete and the temperature at which the catalyst chosen is effective. Although certain catalysts, such as active platinum oxide, effect some decoloration of the crude acids mixture at room temperature, higher temperatures from about 100 to 250° C. are preferred in practice. The upper limit will depend on the catalyst activity. The reaction mass should not reach a temperature at which appreciable reduction of the aromatic nucleus or decomposition of the derivative occurs with any given catalyst, and in general need not be greater than about 250° C.

The reaction mass must be kept under a total pressure sufficient to maintain the mass in the liquid phase and prevent appreciable vaporization of the molten derivative or the solvent. The pressure, in practice, usually varies from about 50 to 2000 p.s.i. The hydrogen partial pressure is not critical, ranging from nearly zero to several hundred pounds per square inch. However, as with the temperature, the hydrogen partial pressure selected is somewhat dependent upon the catalyst used and generally at least about a stoichiometric amount of hydrogen is supplied based on the nitro content of the feedstock. Less active catalysts require higher hydrogen pressures than more active catalysts. Although pressures higher than those that will give a practical rate of reduction of nitrophthalic acids for a given temperature and catalyst can be used, only slight, if any, advantage is gained by doing so. Excessive pressure only requires the use of stronger and more expensive equipment. A slight excess of hydrogen over stoichiometric quantities is preferred to insure complete reduction of the aromatic nitro compounds.

Any solid material which will catalyze a hydrogenation reaction is suitable for use as a catalyst in this process. Metal hydrogenation catalysts are well known and includes such metals as cobalt, iron, molybdenum, nickel, the noble metals platinum, palladium and rhodium and combinations of the foregoing advantageously disposed on a suitable support, for example alumina. Adams catalyst which is platinic oxide (platinum dioxide), platinum on a support such as carbon, palladium, supported or unsupported, and Raney nickel have been found to be particularly suitable. Convenient catalysts are those of the metals of group VIII and the preferred catalyst is platinum oxide. With a platinum catalyst the nitro compound in the phthalic acid or derivative may be reduced to undetectable amounts.

The contacting of the hydrogen, catalyst and impure phthalic acid solution or derivative can be done in a batchwise manner, all of the materials being added at once to the reactor with a stirring of the reactor contents. A continuous process is also practical, using a fixed, moving, or fluidized bed of catalyst. In the fixed or moving bed embodiment the hydrogen and the crude phthalic acid solution are fed to the catalyst-containing reactor either concurrently or countercurrently.

In the case where the phthalic acid or salt has been reduced in solution in an aqueous or other polar solvent, the hydrogenation treatment is followed by crystallization of the phthalic acid or salt from the solution, usually by mere release of the pressure and cooling to ambient temperature. However, before crystallization the solution may be treated with activated carbon, as described in the aforementioned copending application Serial No. 709,735 and/or a cation exchange material as described in copending application Serial No. 699,211. If the salt form of the acid has been subjected to the hylrogenation treatment it is advisable to convert this to the free acid form by mixing the solution before crystallization with a dilute solution of an inorganic acid, the anion of which will not precipitate the metal ion of the salt in solution. Dilute nitric acid is preferred, although HCl and $H_2SO_4$ are effective in most cases. When calcium or barium phthalate is the salt in an aqueous solution, it may be necessary to add a sequestrant such as sodium hexametaphosphate or sodium ethylene diamine tetraacetate to the solution to prevent precipitation of the calcium or barium sulfates. The crystallized phthalic acid may then be converted to a meltable derivative by converting to the ester or anhydride as outlined below. If a dissolved derivative has been subjected to the catalytic hydrogenation, the solution may be treated by adsorption or ion exchange directly after leaving the hydrogenation stage. This solution may then be passed directly to the distillation apparatus to evaporate the solvent, or else the derivative may be separated from the solvent by allowing it to crystallize.

It is also possible, when the hydrogenation has been performed upon the molten phthalic acid derivative, to allow the molten mass to solidify after the reduction treatment and dissolve this mass in a suitable solvent, e.g. a hydrocarbon, whereby the derivative may be recrystallized and/or subjected to activated carbon and/or ion exchange treatment, when these procedures are felt to be desirable for further purification of the crude acid.

MANUFACTURE OF DERIVATIVE

As explained above, the crude phthalic acid is subjected to distillation as a meltable derivative. To preserve the basic structure of the phthalic acid the two carboxyl groups of the phthalic acid molecule are exploited in forming the derivative. Furthermore, since it is preferable to use a low boiling derivative, it is best to convert to a derivative having minimum molecular weight. The anhydride is suitable for use in the process, but only the ortho isomer forms the inner anhydride. The other isomers, or even the ortho isomer, are conveniently esterified with an alcohol containing one to four carbon atoms.

Conversion of orthophthalic acid to its anhydride is easily performed by heating a mass of the dry crystals to an elevated temperature, for example a temperature between about 130° and 240°. A range of about 170° to 230°, or better still, about 190° to 220° C. is preferred. It has also been found that the dehydration can conveniently be conducted by melting and heating a small portion of the orthophthalic acid to a temperature of about 200° C., and gradually adding more orthophthalic acid to the mass over a period of about one hour. Pressures should be maintained on the mass sufficient to keep it in the liquid state. The water formed in this stage is passed overhead. If any iso- or terephthalic acids are present in the mass which is to be dehydrated they will remain for the most part in solid form when the other isomer liquefies, since their boiling points are much higher and they are of limited solubility in molten orthophthalic anhydride. The unmelted constituents may be conveniently removed from the molten orthophthalic acid anhydride by filtration.

The individual isomers or a mixture of them may be put in a condition suitable for melting by converting the acid to its ester. It is advantageously esterified with a low boiling aliphatic alcohol. The alcohol usually is monohydroxy alcohol containing up to about 4 carbon atoms. Preferred alcohols are methanol, ethanol and n-butyl alcohol.

The esterification can be conducted by adding phthalic acid, at least about 2 moles of the alcohol per mole of phthalic acid, and about 0.05 to 0.5% of a catalyst such as $H_2SO_4$, or p-toluene sulfonic acid to just enough solvent such as toluene or xylene to dissolve the soluble components. This mixture is reacted in a flask fitted with a water trap and a reflux condenser at a temperature of about 100 to 140° C., when using toluene as the solvent, or even up to about 195° C. when xylene is employed, and the reaction is continued under reflux until the theoretical amount of water is collected. Then, a slight excess of the alcohol may be added with continued heating, until water once more ceases to be evolved, thus assuring complete esterification. The sample is filtered and may be stripped at 2 to 5 mm. Hg and an elevated temperature to remove solvent, water and unreacted constituents, if the ester is to be recovered as such. If the phthalic acid is to be hydrogenated after conversion to the ester, the stripping may be delayed until after reduction. In this alternative, the solvent used in the esterification and conditions of temperature and pressure must be selected so as to keep the ester in the liquid state during the hydrogenation. For example, this esterification, with methanol, is usually conducted under pressure to permit use of the required elevated temperature. Atmospheric pressure is more feasible for esterifications in which the higher boiling alcohols are used. The stripping furthermore may then be accomplished as the forerun in the distillation step.

DISTILLATION

The purified phthalic acid derivative is removed from the reduced impurities by distillation at a convenient pressure and temperature. The temperature is generally maintained between about 130° C., the melting point of the anhydride and about 230° C. A temperature range of about 170 to 220° C. is usually preferred, since most of the usable derivatives of phthalic acid are molten in this range without substantial decomposition. The pressure will be adjusted to a value corresponding to the vapor pressure of the molten derivative at the temperature chosen. The most advantageous pressure from the standpoint of speed in the operations and cost of the pressure equipment can easily be determined.

The distillation will usually give a forerun of materials lower boiling than the phthalic acid derivative. This may include solvent from the esterification reaction, occluded water, etc. The distillation also leaves a high-boiling bottoms product after the purified phthalic acid has been removed overhead. It is hypothesized that these high-boiling materials are amide or polyamide type structures similar to polypeptides. However, the invention is not to be limited by this theory. The heat applied to the molten derivative in practicing the process of this invention perhaps serves to convert the reduced color-forming bodies in the crude acid to higher boiling materials by dimerization or polymerization of amino groups with carboxyl groups.

After distillation, the purified derivatives may be converted back to the free acid form by any suitable means, such as saponification and/or acidification, in the case of the esters, or by hydration in the case of the anhydride.

The following examples will serve to illustrate the process of the invention but are not to be considered as limiting.

*Example I*

Crude iso-/terephthalic acids were produced by air oxidation of m-/p-xylenes with a cobalt catalyst at 150° C. and 225 p.s.i., followed by nitric acid oxidation of the dexylenized air oxidate (mostly toluic acid) at 190° C with 30 parts 10% nitric acid to one part of the dexylenized air oxidate.

This crude iso-/terephthalic acid material, containing 1.3% nitrophthalic acids, was esterified at 150° C. and 400 p.s.i.g. pressure with three parts of methanol using 0.5% sulfuric acid catalyst. Water and methanol were continually removed from the reaction mixture and replaced with fresh methanol. After two hours reaction time the product was shown to be 99.5% dimethyl esters by infrared analysis. The ester was worked up by dissolving the ester-methanol mixture in xylene, washing with dilute caustic followed by water, and distilling off the xylene at atmospheric pressure.

The ester was then fractionally distilled into six approximately equal distillate fractions which analyzed as follows:

TABLE I

| Fraction | B.P. at 54 mm., ° C. | Weight, g. | Acid Number | $CHCl_3$ color (APHA)[1] | $H_2SO_4$ color (APHA)[2] | Nitrophthalate content, percent |
|---|---|---|---|---|---|---|
| 1 | 186–188 | 63 | 0.34 | 20 | 100 | 0.53 |
| 2 | 188.5 | 147 | 0.10 | 8 | 100 | 0.59 |
| 3[3] | 188.5 | 58 | } 0.36 | 9 | 100 | 0.86 |
| 4[3] | 188.5 | 70 | | | | |
| 5[3] | 188.5 | 70 | | | | |
| 6 | 189 | 62 | 0.28 | 10 | 100 | 1.4 |

[1] APHA color of solution of 2 g. of ester in 10 ml. of chloroform.
[2] APHA color of solution of 0.2 g. of ester in 10 ml. of 95% sulfuric acid after 2 hours at ca 25° C.
[3] Fractions 3, 4, and 5 were combined before analysis.

After analysis, the six fractions were melted and combined and hydrogenated in presence of a platinum catalyst without use of solvent at 150° C. for 1.5 hours with a maximum hydrogen pressure of 1000 p.s.i.g. After hydrogenation, the material showed 0.00% nitrophthalate content. The hydrogenated material was then fractionally distilled in the same column and essentially under the same conditions as previously. Heating up to refluxing temperature took one hour and the distillation took three hours. The distillate fractions analyzed as follows:

TABLE II

| Fraction | B.P. at 50 mm., ° C. | Weight, g. | Acid number | $CHCl_3$ color (APHA) | $H_2SO_4$ color (APHA) | Primary amine nitrogen, p.p.m. |
|---|---|---|---|---|---|---|
| 1 | 185–187 | 33 | 0.29 | 7 | 25 | ---------- |
| 2 | 187 | 96 | 0.00 | 3 | 5 | } 14 |
| 3 | 187 | 113 | 0.05 | 4 | 7 | |
| 4 | 187 | 116 | 0.03 | 4 | 9 | |
| 5 | 187 | 46 | 0.00 | 5 | 17 | ---------- |

These analyses showed a considerable improvement in product quality due to hydrogenation and distillation. Moreover, the middle fractions, 2, 3 and 4, were of excellent quality; the sulfuric acid color test showing colors of less than 10 in each case.

*Example II*

A feedstock analyzing as 1.0% benzoic acid, 76.5% o-toluic acid, 6.5% m-toluic acid, 2.0% p-toluic acid, 8.08% phthalide and 3.0% phthalic anhydride was contacted in a reactor at a temperature of 400° F. and 300 p.s.i.g. pressure for 60 minutes with an 11% aqueous nitric acid solution in a 100% nitric acid/toluic acid weight ratio of 20:1. After the reaction a product was crystallized at a temperature of 150° F. which analyzed as 87.1% o-phthalic acid, 6.8% isophthalic acid, 2.3% teraphthalic acid, and 3.8% nitrophthalic acid.

A portion of this product was dissolved in water to make a 5% solution. The aqueous solution was fed at a rate of 0.52 gal./ft.³/min. through a catalyst bed 30" long by 0.6" I.D., consisting of 0.2% palladium-on-carbon pellets maintained at 300° F. and 400 p.s.i.g. A stream of hydrogen was introduced countercurrent to the aqueous stream. The hydrogenator effluent was then passed through another reactor containing activated carbon at a rate of 0.45 gal./ft.³/min. The carbon treater effluent was allowed to cool and the crystallized o-phthalic acid, containing 1.03% aminophthalic acids and no detectable amount of nitrophthalic acids, was filtered and dried. The iso- and terepthalic isomers remained in the filtrate.

The crude reduced o-phthalic acid (908 g.) was slowly (2 hours) charged to a pot heated to 200° C. Dehydration proceeded rapidly yielding 80 cc. of water as an overhead material along with 8 g. of sublimed o-phthalic acid, and 792 g. of crude phthalic anhydride. This was distilled at 48 mm. through a 36-inch helices-packed column (Table III). The sulfuric acid test, when applied to the major fraction (3) gave an excellent Gardner color of about 1.

TABLE III

| Fraction | Distillation of phthalic anhydride [1] | | | | | Percent N, p.p.m. | $H_2SO_4$ color Gardner [2] |
|---|---|---|---|---|---|---|---|
| | Temp., ° C. | | Reflux ratio | Weight, g. | Weight percent of charge | | |
| | Pot | Head | | | | | |
| 1 | 182–183 | 170–175 | 8/1 | 13 | 1.6 | <11 | >6 |
| 2 | 183–185 | 175–180 | 2/1 | 64 | 8.1 | <7 | 2 |
| 2 | 185–186 | 180–181 | 1/1 | 476 | 60.1 | <7 | 1 |
| 4 | 186–188 | 181 | 1/1 | 96 | 12.1 | <7 | 1 |
| 5 | 188–266 | 181–175 | 1/1 | 17 | 2.1 | <20 | 1.5 |
| Trap | | | | 1 | 0.1 | | |
| Head | | | | 7 | 0.9 | | |
| Column | | | | 18 | 2.3 | | |
| Pot | | | | 97 | 12.2 | | |
| | | | | 789 | 99.5 | | |

[1] The initial o-phthalic acid charge gave a Gardner color of >8 with sulfuric acid at 100° C.
[2] Gardner color of solution of 2 g. of sample in 2 ml. of 95% sulfuric acid after 10 min. at 100° C.

*Example III*

Another portion of the crude orthophthalic acid produced in Example II and containing the nitrophthalic acid impurities, was dehydrated as in Example II before hydrogenation. Without filtering off the unmelted iso- and terephthalic acid crystals, 541 grams of this crude anhydride were charged, along with about 0.2 g. platinum oxide, to an Aminco stainless steel liner and placed in a bomb. The reactor was flushed with argon, evacuated and then filled with hydrogen to 400 p.s.i.g. at 75° F. The reactor was heated to 375° F. and shaking was begun. After shaking for 2.5 hours the bomb was removed and quenched. The bomb was opened and a fresh sample of catalyst introduced. The hydrogenation procedure was repeated for another two hours after which time the bomb was removed and quenched. The reduced material was shown to have a nil nitro-body content calculated as nitrophthalic acids. In addition it contained 6.7% isophthalic acid, 1.2% terephthalic acid and 88.8% phthalic anhydride. The reduced material was filtered through a medium porosity filter at 150° C. to remove the majority of the iso- and terephthalic acids. The filtrate containing 0.8% isophthalic acid and no detectable terephthalic acid, was distilled through a glass helices-packed column at 94–100 mm. The distillation proceeded smoothly for 3.5 hours yielding a fluid bottoms and an overhead material of excellent purity.

TABLE IV

| Fraction | Temp., ° C. | | Pressure, mm. | Weight, g. | Weight percent of charge | NPA [1] Weight percent | Percent N |
|---|---|---|---|---|---|---|---|
| | Head | Pot | | | | | |
| 1 | 193–200 | 208 | 94–95 | 13 | 3.7 | Nil | <2 p.p.m. |
| 2 | 201 | 208–210 | 95–99 | 12 | 3.4 | Nil | |
| 3 | 201–203 | 208–230 | 91–99 | 255 | 72.6 | Nil | <2 p.p.m. |
| 4 | 202–203 | 230–278 | 96–100 | 33 | 9.4 | 0.02 | <2 p.p.m. |
| 5 | (Bottoms [2]) | | | 29 | 8.3 | | 3.16. |
| 6 | Column holdup | | | 8 | 2.3 | | |
| | | | | 350 | 99.7 | | |

[1] Nitrophthalic acids (NPA) determined by polarograph.
[2] Contained 21.6% phthalic anhydride.

*Example IV*

The following example shows the poor results obtained when the distillation is performed upon unreduced free phthalic acid. 350 g. of the crude o-phthalic acid produced in Example II was mixed with 150 g. of the m- and p-phthalic acids produced in Example I. This mixture was distilled through a 3-foot helices-packed column as follows:

TABLE V

| Fraction | Temp., ° C. | | P, mm. | Weight, g. | Percent of charge | NPA,[1] percent |
|---|---|---|---|---|---|---|
| | Head | Pot | | | | |
| 1 | 150–160 | 200–250 | 28 | 64 | 12.8 | 0.07 |
| 2 | 160–165 | 250–275 | 28 | 137 | 37.4 | 0.13 |
| 3 | (2) | (2) | | 45 | 9.0 | 0.49 |
| Residue | | | | | 37.8 | 4 |
| Trap | (3) | (3) | | 15 | 3.0 | |

[1] NPA = Nitrophthalic acids (and anhydrides).
[2] Column holdup. [3] Water.

Approximately 50% of the phthalic anhydride was taken overhead. The residue from the distillation contained phthalic anhydride (33%), nitrophthalic acid (4%) and iso- and terephthalic acids (45% and 17%). Nitrophthalic acids (86 g.) were added to the residue (3-nitro-o-phthalic acid, 32.5 g.; 4-nitro-o-phthalic acid, 32.5 g.; 5-nitroisophthalic acid, 16.5; and nitroterephthalic acid, 4.5 g.). This mixture was then distilled through a 10-inch helices-packed column at 25 mm. until the pot and overhead temperatures were 310° C. and 167° C., respectively. The distillation data are presented in Table VI.

TABLE VI

| Fraction | Temp., ° C. | | P, mm. | Weight, g. | Percent of charge | NPA,[1] percent |
|---|---|---|---|---|---|---|
| | Head | Pot | | | | |
| 1 | 156–165 | 210–260 | 25 | 4 | 1.2 | |
| 2 | 165–167 | 260–310 | 25 | 76 | 23.5 | |
| 3 | (2) | (2) | | 9 | 2.8 | |
| Residue | | | | 228 | 70.5 | 26 |
| Trap | (3) | (3) | | 7 | 2.0 | |

[1] NPA = Nitrophthalic acids (and anhydrides).
[2] Column holdup. [3] Water.

The residue from this distillation contained 5.6% phthalic anhydride, 26% nitrophthalic acids, 49% isophthalic acid and 16% terephthalic acid.

*Example V*

30 parts by weight of a crude iso/terephthalic acid produced from xylene as in Example I, and containing 2.9% nitrophthalic acid, were placed in a glass ampule along with 1500 parts by weight of water and four parts by weight of sodium metabisulfite. The ampule was sealed and placed in an aluminum rocking bomb. This bomb was heated thermostatically to a temperature of 220° C. and maintained at this temperature for 10 minutes. After cooling to room temperature the precipitated phthalic acid crystals were found to contain 0.09% nitrophthalic acid.

This acid was converted to its dimethyl ester and the ester was worked up by the procedure outlined in Example I, and fractionally distilled. The analytical results on five successive fractions are shown in Table VII.

TABLE VII

| Frac. No.[1] | Weight, g. | Color, APHA | | Acid number | NPA, percent | Sulfur, percent |
|---|---|---|---|---|---|---|
| | | $CHCl_3$ | $H_2SO_4$ | | | |
| 1 | 58 | 8 | 100 | 0.12 | 0.015 | |
| 2 | 159 | 4 | 10 | 0 | | |
| 3 | 287 | 5 | 5 | 0.02 | | 0.36 |
| 4 | 220 | 5 | 7 | 0 | | |
| 5 | 140 | 10 | 10 | 0 | 0.006 | |

[1] All fractions of the distillate had a strong pungent odor.

It can be seen from these examples that distilling molten reduced derivatives of crude phthalic acid appears to convert the reduced color-forming impurities to higher boiling materials which are effectively removed from the purified phthalic acid. It is essential for good yields and effective removal of the nitrogenous constituents that the nitro-bodies be reduced. Also, it is obvious that any meltable derivative of phthalic acid, that is, one which can be melted and distilled without decomposition is suitable for use in this process.

We claim:

1. In a process for treating a crude, molten phthalic acid derivative selected from the group consisting of orthophthalic anhydride and a phthalic acid ester of an alcohol containing 1 to 4 carbon atoms, said crude phthalic acid derivative having been obtained by nitric acid oxidation of a methyl-substituted benzene to produce phthalic acid containing nitrophthalic acid impurity, conversion of the phthalic acid to said selected derivative, reduction of the nitrophthalic acid impurity to aminophthalic acid impurity, and melting said derivative, the step which comprises distilling said reduced, molten derivative at a temperature greater than about 130° C. and less than the decomposition temperature of the derivative to separate said derivative overhead from higher-boiling materials to obtain said derivative substantially free of nitro compounds.

2. In a process for treating crude, molten orthophthalic anhydride obtained by nitric acid oxidation of a methyl-substituted benzene to produce orthophthalic acid containing nitrophthalic acid impurity, dehydration of the orthophthalic acid, reduction of the nitrophthalic acid impurity to aminophthalic acid impurity and melting of the orthophthalic anhydride, the step which comprises distilling said reduced, molten anhydride at a temperature greater than about 130° C. and less than the decomposition temperature of the anhydride to separate the anhydride overhead from higher-boiling materials to obtain said anhydride substantially free of nitro compounds.

3. In a process for treating a crude, molten phthalic acid ester of an alcohol containing 1 to 4 carbon atoms obtained by nitric acid oxidation of methyl-substituted benzene to produce phthalic acid containing nitrophthalic acid impurity, esterification of the phthalic acid, reduction of the nitrophthalic acid impurity to aminophthalic acid impurity, and melting of the ester, the step which comprises distilling said ester at a temperature greater than about 130° C. and less than the decomposition temperature of the ester to separate said ester overhead from higher-boiling materials to obtain said ester substantially free of nitro compounds.

4. The process of claim 1 in which the reduction is performed by liquid state catalytic hydrogenation.

5. The process of claim 4 in which the liquid state is obtained by melting the phthalic acid derivative.

6. The process of claim 4 in which the reduction is performed on a polar solvent solution of phthalic acid and nitrophthalic acid impurity.

7. The process of claim 4 in which the distillation is performed at a temperature of about 170 to 220° C.

References Cited in the file of this patent

UNITED STATES PATENTS

| | | |
|---|---|---|
| 2,349,518 | Porter | May 23, 1944 |
| 2,741,633 | McKinnis | Apr. 10, 1956 |
| 2,789,988 | Brown et al. | Apr. 23, 1957 |

FOREIGN PATENTS

| | | |
|---|---|---|
| 524,440 | Canada | May 1, 1956 |
| 727,184 | Great Britain | Mar. 30, 1955 |

OTHER REFERENCES

Wagner et al.: Synthetic Organic Chemistry (1953), pp. 654–7.